Feb. 6, 1923.
E. LUNN
AIR MOTOR DRIVEN GENERATOR
Filed Sept. 12, 1921
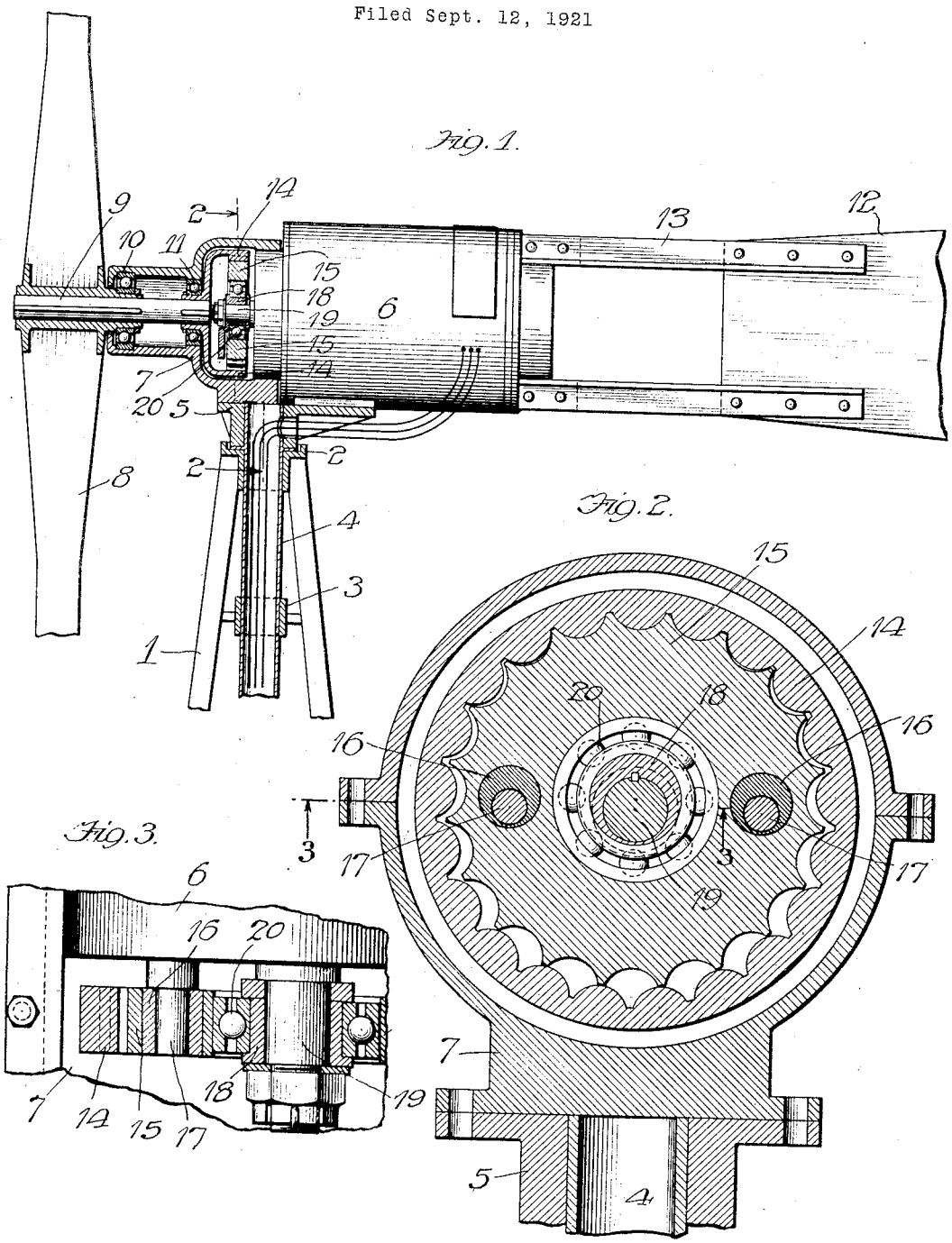
Witness
Martin H. Olsen.
Inventor
Ernest Lunn
By Rummler & Rummler
Attys.

Patented Feb. 6, 1923.

1,444,620

UNITED STATES PATENT OFFICE.

ERNEST LUNN, OF CHICAGO, ILLINOIS.

AIR-MOTOR-DRIVEN GENERATOR.

Application filed September 12, 1921. Serial No. 499,943.

*To all whom it may concern:*

Be it known that I, ERNEST LUNN, a citizen of the United States of America, and a resident of Chicago, county of Cook, and State of Illinois, have invented certain new and useful Improvements in Air-Motor-Driven Generators, of which the following is a specification.

The purpose of this invention is to provide a wind-driven electric generator for charging batteries and other such uses in which the intermittent operation of the generator is permissible. The invention does not relate to the design of a wind motor or a generator but to the combination of a motor and generator with an especially designed improved speed increasing gearing between the motor and generator of such high efficiency as to make a wind motor driven generator a practical device.

With this end in view the invention includes a wind motor, the driven shaft of which carries an internal gear. The internal gear meshes with an external gear of somewhat less diameter which is eccentrically mounted on eccentric bearings, both on the shaft of the generator and a rigid part of the generator frame structure. This eccentric mounting of the external gear prevents it from rotating on its axis while permitting the gear to move bodily in a circular path around the axis of the generator. As it takes this circular motion, its eccentric supports rotate on their axes and since the central eccentric is fast to the generator shaft, this shaft is driven to make one revolution for each circular motion of the external gear. Due to the small difference in the number of teeth between the two intermeshing gears, the external gear is driven at a greatly increased speed over the internal gear carried by the wind motor. In the example shown in the drawing, the difference in the speeds is 21 to 1. The merit of the particular design of gearing illustrated is its ability to step up the speed at such a large ratio with exceedingly small loss of power and its simplicity of design. Eccentric gears, as commonly employed in different arts, are generally used as reduction gears but as designed are apt to either lock or operate with difficulty when the direction of motion is reversed.

Figure 1 of the drawings shows the device in side elevation partly in section and with the wind motor and directing vane shown as partly broken away.

Figure 2 is a transverse vertical section on a larger scale on a line 2—2 of Figure 1, passing through the speed increasing gears.

Figure 3 is a sectional detail on a line 3—3 of Figure 2.

Like most windmills, the device as a whole is rotatably mounted on a vertical axis at the upper end of an open mast or supporting structure 1. This mast is provided with a thrust bearing 2, and radial bearings 3 within which the tubular shaft 4 may rotate. This shaft at its upper end carries a suitable support 5 for the generator 6 and the housing frame 7 of the wind motor. The rotor 8 of the wind motor is keyed to a horizontal shaft 9 having bearings 10 and 11 in the hollow frame 7. The frame 7 is rigid with the frame of the generator 6 and the latter at its rear end supports the directing vane 12 by the angle bars 13. An internal gear 14 is rigidly secured to the inner end of shaft 9. An external eccentric gear 15 is supported by a plurality of discs 16 rotatably and eccentrically mounted on stub shafts 17 extending from the frame of generator 6. These stub shafts are in fixed position on the frame and therefore prevent gear 15 from rotating on its axis while not preventing the gear from executing a circular bodily motion in a path the radius of which is determined by the extent of eccentricity of the discs 16. A similar central eccentric disc 18 is keyed to the generator shaft 19 and interposed between the disc 18 and gear 15 is a suitable ball-bearing 20. Accordingly when gear 15 travels in its orbit as driven by the wind motor gear 14, the generator shaft 19 is positively driven due to the crank action imparted to the shaft by gear 15 through eccentric 18. Rotation of the shaft 19 and the armature thereon is at a comparatively high rate with respect to the rotor 8 and assuming that the circuit of the generator is equipped with the usual cut-in and out switching devices to the accumulator, when the speed of the generator is sufficient for delivering the charging current, the generator becomes effective for the desired work. The conductors 21 shown passing from the generator downwardly through the hollow shaft 4 terminate at suitable slip-rings, not shown, from which the current is led to the battery.

In the operation of the device, assuming that the ratios between the gears 14 and 15 are that shown in the drawings, for every 1/21 revolutions of the wind motor, gear 15 will execute one circular bodily motion without turning on its axis and drive shaft 19 one revolution. The gear 15 is guided in its motion by the eccentrics 16 swinging around the fixed stub shafts 17. Since the gear 15 cannot rotate on its axis, it is compelled to permit rotation of gear 14 by being driven by the gear 14 in a circular path. The latter gear is permitted to move to advance one tooth-space for each circular motion of gear 15.

Either the internal or the external gear may be the one which is fast to the air motor shaft 9 and rotatable therewith, the remaining gear being non-rotatable on its axis but being arranged to be driven in a circular path around the axis of the gear on shaft 9. The gear which does not rotate must be suitably supported for its circular motion as by the eccentric discs 16. There may be a greater number of these discs than shown in the drawing, but it is important to have the same of small diameter with respect to their throw or eccentricity in order to attain the maximum efficiency. This is likewise true of the central eccentric or crank 18, the aim being to provide the best driving angle between the surfaces of the eccentrics and the gear 15. The particular design of teeth illustrated in the drawings is also found to aid materially in attaining the desired successful and efficient action.

Although but one specific embodiment of this invention has been herein shown and described, it will be understood that numerous details of the construction shown may be altered or omitted without departing from the spirit of this invention as defined by the following claim.

I claim:

The combination of an air-motor, an electrical generator, gearing between said air-motor and generator, said gearing comprising one internal and one external gear intermeshing, one of said gears being rotatable on its axis with the air motor, and the remaining gear being non-rotatable on its axis but mounted for motion in a circular path around the axis of the remaining gear and having a crank or eccentric connection with the generator for driving the generator.

Signed at Chicago this 9th day of Sept. 1921.

ERNEST LUNN.